US 9,710,372 B2

(12) United States Patent
Tsirkin

(10) Patent No.: US 9,710,372 B2
(45) Date of Patent: Jul. 18, 2017

(54) VIRTUAL MACHINE BASED HUGE PAGE BALLOON SUPPORT

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

( * ) Notice: Subject to any disclaimer, the term of this patent is extended or adjusted under 35 U.S.C. 154(b) by 5 days.

(21) Appl. No.: 14/824,278

(22) Filed: Aug. 12, 2015

(65) Prior Publication Data

US 2017/0046255 A1    Feb. 16, 2017

(51) Int. Cl.
  *G06F 12/02*    (2006.01)

(52) U.S. Cl.
  CPC ...... *G06F 12/023* (2013.01); *G06F 2212/151* (2013.01); *G06F 2212/652* (2013.01); *G06F 2212/657* (2013.01)

(58) Field of Classification Search
  CPC .............. G06F 12/023; G06F 9/45558; G06F 2009/45583; G06F 2212/151; G06F 9/45533; G06F 12/08; G06F 2212/657; G06F 2212/652
  USPC .......................................................... 711/6
  See application file for complete search history.

(56) References Cited

U.S. PATENT DOCUMENTS

| 7,788,461 | B2 | 8/2010 | Rawson, III | |
|---|---|---|---|---|
| 8,484,405 | B2 | 7/2013 | Mashtizadeh et al. | |
| 8,769,184 | B2 | 7/2014 | Ali et al. | |
| 8,949,295 | B2 * | 2/2015 | McDougall | G06F 12/023 707/813 |
| 9,176,766 | B2 * | 11/2015 | Shah | G06F 9/45558 |
| 9,280,458 | B2 * | 3/2016 | Durrant | G06F 12/023 |

FOREIGN PATENT DOCUMENTS

WO    2013/082598    6/2013

OTHER PUBLICATIONS

Gadre et al., X-XEN: Huge Page Support in Xen, 2011, https://www.kernel.org/doc/ols/2011/ols2011-gadre.pdf, Pune Institute of Computer Technology (6 pages).

Jain, "Design and Implementation of Huge-page aware Memory-Overcommitment solution using Balooning and Sharing", Jul.-Dec. 2013, http://www.cse.iitb.ac.in/synerg/lib/exe/fetch.php?media=public:students:sailee:stage1_final_report.pdf, Department of Computer Science and Engineering, Indian Institute of Technology, Bombay Mumbai (34 pages).

Liu, "Linux Xen Balloon Driver Improvement", Oct. 2014, http://xenbits.xen.org/people/liuw/xen-balloon-driver-improvement.pdf (7 pages).

(Continued)

*Primary Examiner* — Jasmine Song
(74) *Attorney, Agent, or Firm* — K&L Gates LLP

(57) ABSTRACT

Systems and methods for virtual machine based huge page balloon support are provided. A guest operating system (OS) receives a request from a hypervisor for guest memory to be made available to a host operating system (OS). The guest OS further receives a huge page size of a host page and a quantity of requested guest memory. The guest OS then allocates unused guest memory and transmits at least one address of the allocated guest memory to the hypervisor, where the allocated guest memory is a contiguous block of memory that is at least the size of the huge page size and aligned to the size of the huge page size.

16 Claims, 6 Drawing Sheets

(56) References Cited

OTHER PUBLICATIONS

Pham et al., "Using TLB Speculation to Overcome p. Splintering in Virtual Machines", Mar. 2015, http://www.cs.rutgers.edu/~abhib/binhpham-tr15.pdf, Dept. of Computer Science, Rutgers University; AMD Research (12 pages).
"Libvirt Error When Enabling Hugepages for Guest", Oct. 22, 2014, http://unix.stackexchange.com/questions/163495/libvirt-error-when-enabling-hugepages-for-guest (5 pages).
"5.2. Huge Pages and Transparent Huge Pages", https://access.redhat.com/documentation/en-US/Red_Hat_Enterprise_Linux/6/html/Performance_Tuning_Guide/s-memory-transhuge.html (3 pages).

\* cited by examiner

Extended Page Table 182

| | | | |
|---|---|---|---|
| 210A x0001 | 220A Present | 230A Read-Write | 240A Address of Unallocated Memory x01AF |
| 210B x0002 | 220B Present | 230B Executable Only | 240B Address of Unallocated Memory x01FF |
| 210C x0003 | 220C Non-present | 230C Executable | 240C Address of Memory Allocated to App 198A x024F |
| 210D x0004 | 220D Non-present | 230D Read Only | 240D Address of Memory Allocated to App 198B x029F |

Page Entry 200A, Page Entry 200B, Page Entry 200C, Page Entry 200D

FIG. 2

VIRTUAL MACHINE BASED HUGE PAGE BALLOON SUPPORT

BACKGROUND

The present disclosure relates generally to memory management of virtual machines, and more particularly to ballooning with assigned devices. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. The present disclosure provides improved systems and methods for managing memory in a virtual environment.

SUMMARY

The present disclosure provides a new and innovative system, methods and apparatus for virtual machine based huge page balloon support.

An example system comprises one or more physical processors, a hypervisor executing on the one or more physical processors, a host operating system (OS) executing on the one or more physical processors, and a virtual machine, including a guest operating system (OS), executing on the one or more physical processors.

A guest operating system (OS) receives a request from a hypervisor for guest memory to be made available to a host operating system (OS). The guest OS further receives a huge page size of a host page and a quantity of requested guest memory. The guest OS then allocates unused guest memory and transmits at least one address of the allocated guest memory to the hypervisor, where the allocated guest memory is a contiguous block of memory that is at least the size of the huge page size and aligned to the size of the huge page size.

Additional features and advantages of the disclosed method and apparatus are described in, and will be apparent from, the following Detailed Description and the Figures.

BRIEF DESCRIPTION OF THE FIGURES

FIG. 2 a block diagram of an example extended page table according to an example embodiment of the present disclosure.

DETAILED DESCRIPTION OF EXAMPLE EMBODIMENTS

Figure 1:
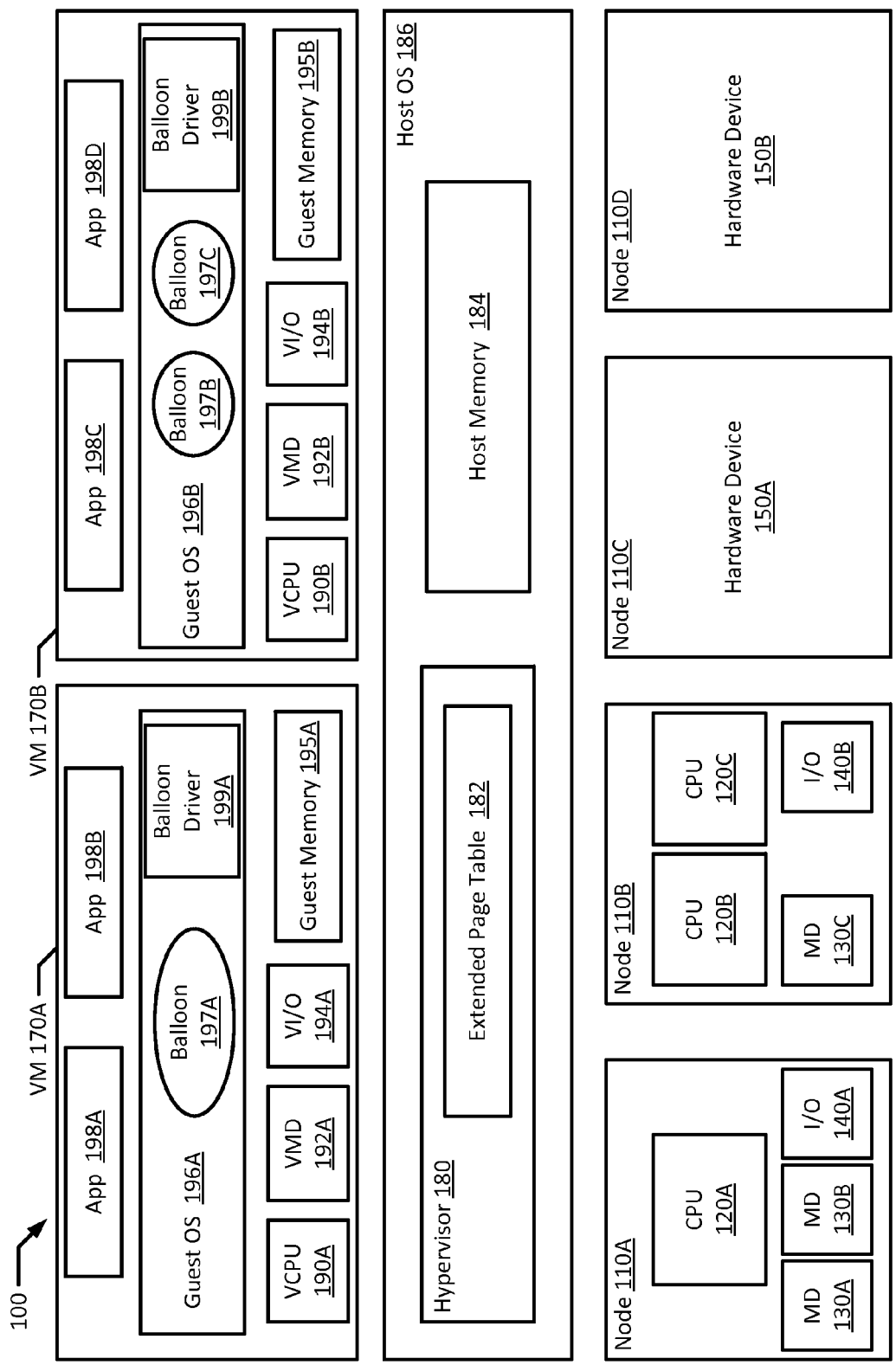
FIG. 1 is a block diagram of an example multiprocessor computer system according to an example embodiment of the present disclosure.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-C, I/O 140A-B, a software device, and/or hardware device 150A-B.

As noted above, computer system 100 may run multiple virtual machines (e.g., VM 170A-B), by executing a software layer (e.g., hypervisor 180) above the hardware and below the virtual machines 170A-B, as schematically shown in FIG. 1. In an example embodiment, the hypervisor 180 may be a component of the host operating system 186 executed by the computer system 100. In another example embodiment, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to virtual machines 170A-B as devices, including virtual processors (e.g., VCPU 190A-B), virtual memory devices (e.g., VMD 192A-B), and/or virtual I/O devices (e.g., VI/O 194A-B).

In an example embodiment, a virtual machine 170A-B may execute a guest operating system 196A-B which may utilize the underlying VCPU 190A-D, VMD 192A-B, and VI/O devices 194A-D. One or more applications 198A-D may be running on a virtual machine 170A-B under the guest operating system 196A-B. In an example embodiment, a virtual machine 170A-B may include multiple virtual processors (VCPU) 190A-B. Processor virtualization may be implemented by the hypervisor 180 scheduling time slots on one or more physical processors 120A-C such that from the guest operating system's perspective those time slots are scheduled on a virtual processor 190A-B.

In an example embodiment, the guest operating system 196A-B may use a memory balloon 197A-C to temporarily make guest memory 195A-B available to a host operating system 186 by allocating a portion of the guest memory 195A-B to the memory balloon 197A-C. In an example embodiment, each guest operating system 196B may include multiple balloons 197B-C, where each balloon 197B-C manages memory pages or memory segments of a different size. For example, memory balloon 197B may gather segments of guest memory 195B to provision requests for 512 kB sized memory and memory balloon 197C may gather segments of guest memory 195B to provision requests for 1 MB sized memory. The memory balloons 197A-C may be managed by a balloon driver 199A-B.

The hypervisor 180 manages host memory 184 for the host operating system 186 as well as memory allocated to the virtual machines 170A-B and guest operating systems 196A-B such as guest memory 195A-B provided to guest OS 196A-B. Host memory 184 and guest memory 195A-B may be divided into a plurality of memory pages that are managed by the hypervisor 180. As discussed below, guest memory 195A-B allocated to the guest OS 196A-B are mapped from host memory 184 such that when a guest application 198A-D uses or accesses a memory page of guest memory 195A-B it is actually using or accessing host memory 184.

The hypervisor may keep track of how each memory page is mapped, allocated, and/or used through the use of one or more extended page tables 182. In this manner, the hypervisor 180 can prevent memory allocated to one guest OS 196A from being inappropriately accessed and/or modified by another guest OS 196B or the host OS 186. Similarly, the hypervisor 180 can prevent memory assigned to or being used by one application 198A from being used by another application 198B.

To accommodate a changing demand for memory by the virtual machines 170A-B and host operating system 186, the hypervisor 180 uses memory balloons 197A-B and balloon drivers 199A-B to change the amount of memory allocated between a guest OS 196A-B and a host OS 186. The process of memory ballooning is described in greater detail with reference to FIGS. 5 and 6.

Figure 3:
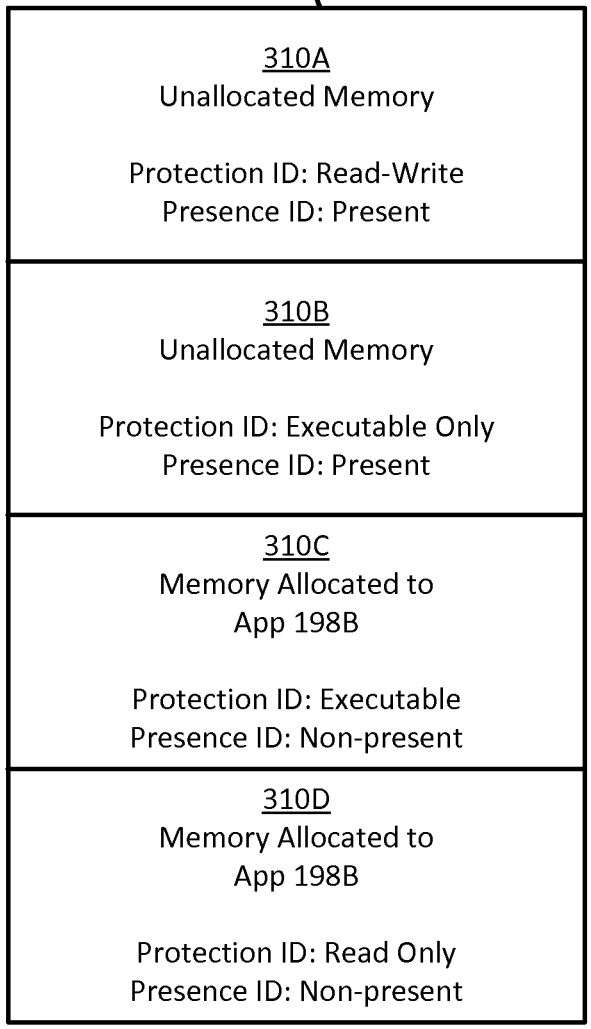
FIG. 3 is a block diagram of example page views and pages according to an example embodiment of the present disclosure.

FIG. 2 illustrates an extended page table (otherwise referred to as a page table) 182 according to an example embodiment of the present disclosure. In general, the hypervisor 180 manages the memory usage of the VMs 170A-B. Both virtual memory and physical memory may be divided into pages 310A-D which are identified with a unique number (e.g., Page Frame Number (PFN) 210A-D). Example embodiments of pages 310A-D and page views 300 are described in greater detail below and as shown in FIG. 3.

A page table 182 is a data structure used by the hypervisor 180 to store a mapping of memory addresses of the guest OS 196A-B to memory addresses of the host OS 186. Accordingly, address translation is handled using page tables 182.

The extended page table 182 comprises page entries 200A-D that map PFN 210A-D (e.g., an address of the guest OS 196A-B) with an address 240A-D (e.g., an address of the host OS 186). Page tables 182 may be used together with any paging data structure used by the VMs 170A-B to support translation from guest OS 196A-B to host OS 186 addresses (e.g., 32-bit linear address space using a two-level hierarchical paging structure, Physical Address Extension mode, INTEL Extended Memory 64 Technology mode, etc.). In an example embodiment, page tables 182 may include presence identifiers 220A-D and protection identifiers 230A-D that indicate an access status for each of the pages 310A-D.

In an example embodiment, page tables 182 may include a presence identifier 220A-D. The presence identifier 220A-D indicates an access status of a page 310A-D corresponding to the page entry 200A-D of the page table 182. For example, a presence identifier 220A-D may used to define that a given page 310A-D is present (or accessible) or non-present (or inaccessible). For example, as illustrated in the example embodiment in FIG. 2, the page 310A corresponding to page entry 200A, PFN 210A address (x0001), address 340A (x01AF), and presence identifier 220A has been defined in page table 182 as 'Present'. The hypervisor 180 may be used to modify a presence identifier 220A-D of pages 310A-D.

In an example embodiment, page tables 182 may include a protection identifier 230A-D. The protection identifier 230A-D indicates the access status of a page 310A-D corresponding to the page entry 200A-D of the page table 182. For example, a protection identifier 230A-D may used to define that a given page 310A-D is writable (or read-write), write-protected (or read-only), executable (or executable and readable), executable only, etc. For example, as illustrated in the example embodiment in FIG. 2, the page 310A corresponding to page entry 200A, PFN 210A address (x0001), address 340A (x01AF), and protection identifier 230A has been defined in page table 182 as 'Read-Write'. The hypervisor 180 may be used to modify a protection identifier 230A-D of pages 310A-D. In addition, in an example embodiment, the page table 182 may include additional information not shown in FIG. 2 including statistics information, background information, dirty identifiers which indicate that modifications to a page must be written back to disk, etc.

In an example embodiment, one or more page tables 182 may be maintained by the hypervisor 180 which map guest OS 196A-B addresses to host OS 186 addresses that are accessible by the hypervisor 180, VMs 170, guest OS 196A-B, Host OS 186, Host OS 186 resources, and/or VM Functions 183. The sizes of different page tables may vary and may include more or fewer entries than are illustrated in FIG. 2.

FIG. 3 illustrates page view 300 and pages 310A-D in accordance with an example embodiment of the present disclosure. As noted above, a page 310A-D may be a portion of physical or virtual memory designated for storing data. As used herein, a page view 300 denotes a mapping from addresses designated for use by VM 170A-B to host OS 186 addresses. In an example embodiment, the page view 300 may denote the mapping from PFNs of a VM 170A-B to host OS 186 addresses, as used during normal execution of the VM 170A-B. As illustrated in FIG. 3, pages 310A-D may be defined by presence identifiers such as 'Non-present' and protection identifiers such as 'Read-Only' in accordance with their respective page table 182 presence identifiers (e.g., 220D) and protection identifiers (e.g., 230D).

Figure 4:
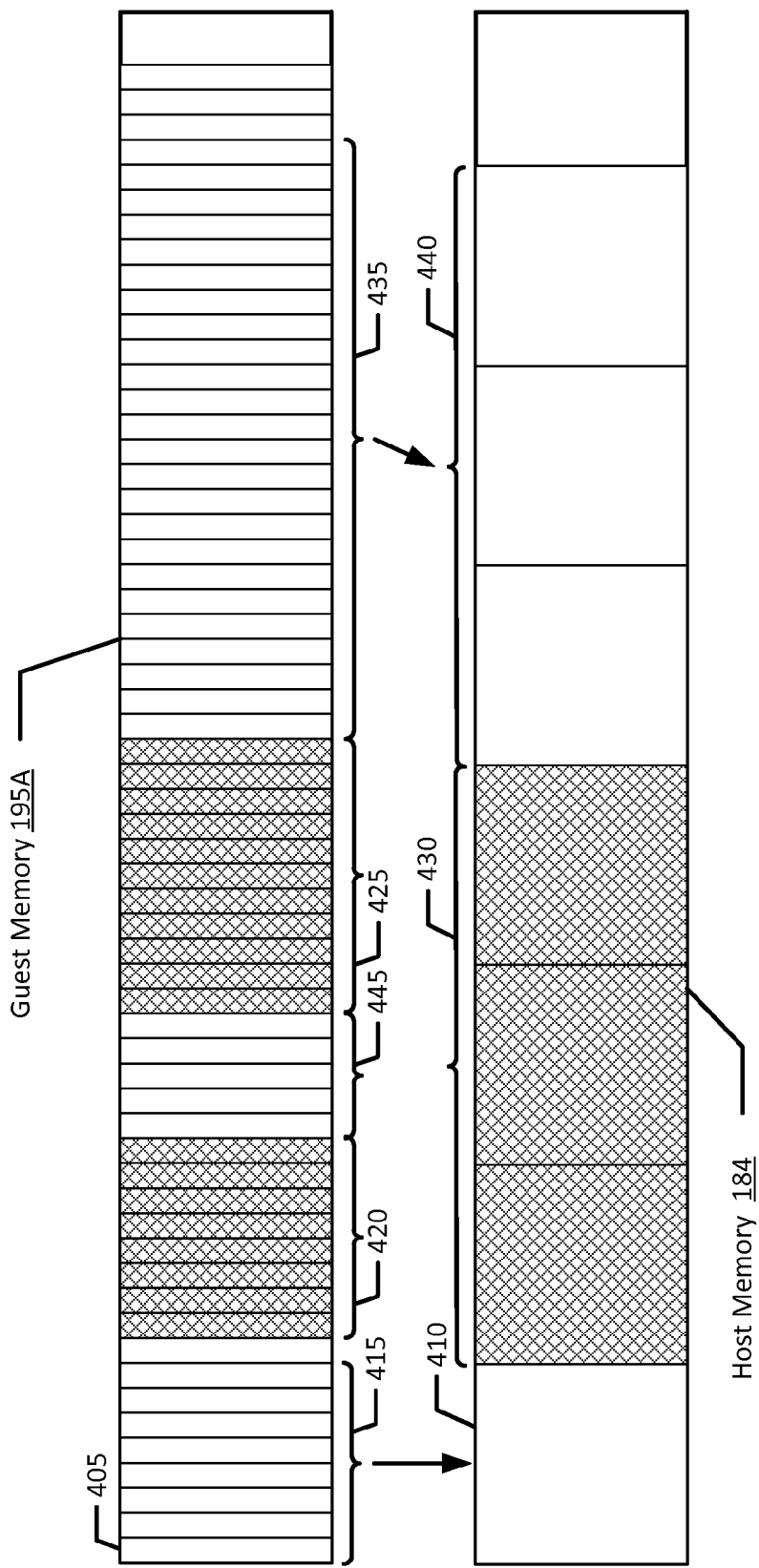
FIG. 4 is a block diagram of example guest memory and host memory according to an example embodiment of the present disclosure.

FIG. 4 illustrates guest memory and host memory according to an example embodiment of the present disclosure. The guest memory 195A and host memory 184 are each divided into memory pages to facilitate the management of memory by the hypervisor 180. For example, memory page 405 corresponds to guest memory 195A and memory page 410 corresponds to host memory 184. In an example embodiment the size of a guest page 405 is significantly smaller than that of a host page 410. As used herein, the host pages (e.g., 410) of the host OS 186 are "huge pages" relative to the size of guest pages (e.g., 405) of the guest OS 196A. These huge page sized host pages (e.g., 410) may be anywhere between a minimum of 8 times and greater than 2000 times the size of a guest page (e.g., 405). Huge pages are also referred to as "large pages" or "super pages." In an example embodiment, each huge page sized host page may range in size between 64 KiB and 2 GiB (e.g., 64 KiB, 256 KiB, 512 KiB, 1 MiB, 2 MiB, 4 MiB, 8 MiB, etc.). In an example embodiment, each guest page may range in size between 4 KiB and 32 KiB (e.g., 4 KiB, 8 KiB, 32 KiB, etc.). For example, in the illustrated example embodiment, a block of eight guest pages 415 equal the size of one host page 410. Accordingly, the block of eight guest pages 415 would need to be allocated for a guest OS 196A to provision sufficient memory for a single host page 410.

In the illustrated example embodiment, the group of pages 415 constitute eight pages of contiguous memory. The illustrated cross-hatched sections of memory (e.g. segments 420, 425, and 430) denote memory that is presently being used (e.g. by an application 198A-D to store and/or access data) and the illustrated white sections of memory (e.g. segments 410, 415, 435, 440, and 445) denote memory that is available to be used and/or allocated. For example, segment 435 (consisting of 24 guest pages) is available to be allocated from the guest OS 196A to the host OS 186 upon request.

Figure 5:
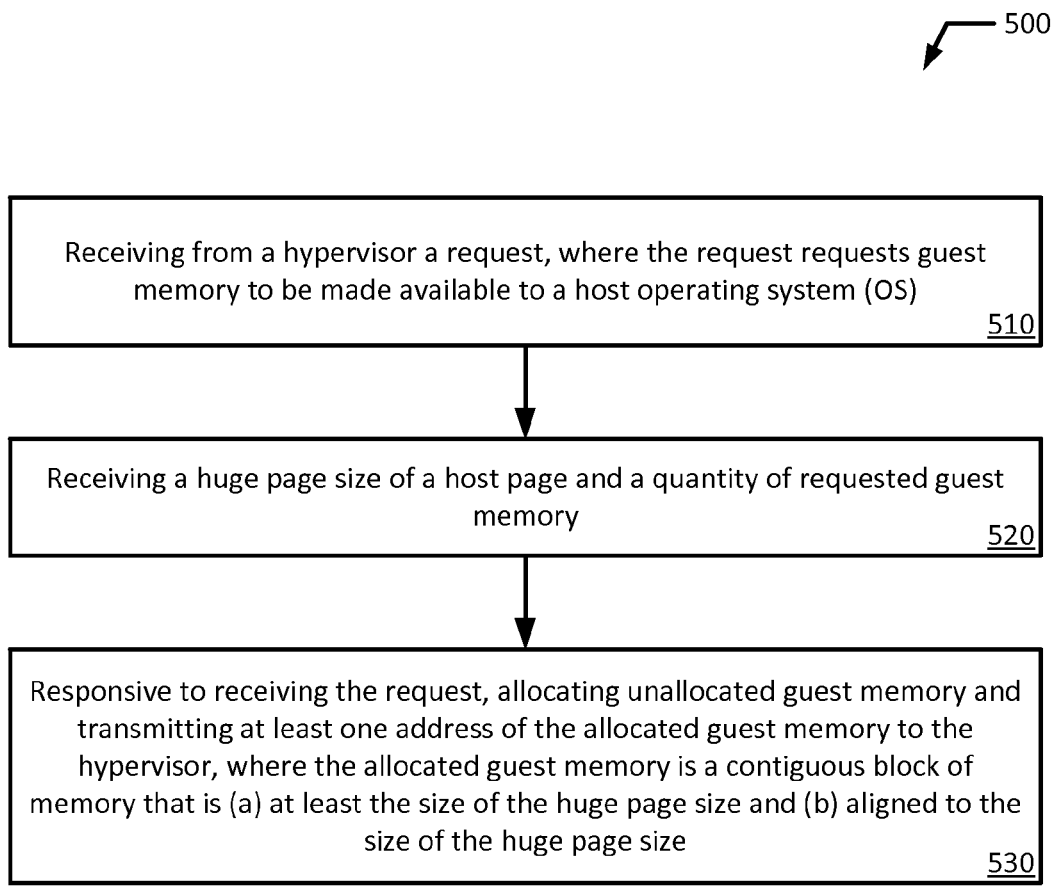
FIG. 5 is a flowchart illustrating an example process for virtual machine based huge page balloon support according to an example embodiment of the present disclosure.

FIG. 5 illustrates a flowchart of an example method 500 for virtual machine based huge page balloon support. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example embodiment, the method is performed by a hypervisor 180.

The example method 500 starts and a guest operating system 196A receives a request from a hypervisor 180 for guest memory 195A to be made available to a host operating system 186 (block 510). In an example embodiment, the hypervisor 180 specifically makes a request to a balloon driver 199A of the guest OS 196A to determine if the host OS 186 can borrow some portion of guest memory 195A.

In an example embodiment, the guest OS 196A then receives a huge page size of a host page and a quantity of requested guest memory 195A (block 520). In an example embodiment, the quantity of requested guest memory 195A may take the form of a number of bytes requested, a number of guest pages (e.g., 405) requested, or a number of host pages (e.g., 410) sought. In an example embodiment, the huge page size and the quantity of requested guest memory 195A are included in the initial request for guest memory 195A. In another example embodiment, the huge page size and the quantity of requested guest memory 195A are provided to the guest OS 196A responsive to a request by the guest OS 196A for this information.

In an example embodiment, responsive to receiving the request, the guest OS 196A allocates unused blocks (e.g., 415 and/or 435) of guest memory 195A and transmits at least one address of the newly allocated blocks (e.g., 415 and/or 435) of guest memory 195A to the hypervisor 180, where each of the newly allocated blocks (e.g., 415 and/or 430) of guest memory 195A is a contiguous block of memory that is (a) at least the size of the huge page size and (b) aligned to the size of the huge page size (block 530).

In an example embodiment, the guest OS 196A allocates unused guest memory pages (e.g., 415 and/or 435) by first identifying contiguous unused blocks (e.g., 415 and/or 435) of guest memory 195A that are at least the size of a single huge page size of a host page (e.g., 410) identified to the guest OS 196A in block 520 and aligned to the size of the huge page size. As used herein, unused memory refers to memory that is not presently assigned to, used, and/or accessed by an application 198A-D, device (e.g., VCPU 190A-B, VMD 192A-B, VI/O 194A-B), or other process of a guest OS 196A-B or host OS 186. Once such contiguous unused blocks (e.g., 415 and/or 435) of guest memory 195A are identified, the guest OS 196A then places the identified blocks (e.g., 415 and/or 435) of unused guest memory 195A into the balloon 197A. As more guest memory pages (e.g., 415 and/or 435) are placed in the balloon 197A, the balloon 197A inflates. In placing the guest memory pages (e.g., 415 and/or 435) into the balloon 197A, the guest OS 196A releases these memory pages (e.g., 415 and/or 435) for use by the host OS 186 (i.e. the guest OS 196A effectively allocates these memory pages to the host OS 186) and further, the guest OS 196A refrains from using these allocated guest memory pages (e.g., 415 and/or 435) while these pages are in the balloon 197A.

In an example embodiment, the guest OS 196A attempts to allocate all of the requested quantity of guest memory 195A. In an example embodiment, the guest OS 196A allocates as many contiguous blocks (e.g., 415 and/or 435) of unused guest memory 195A as are available that are at least the size of the huge page size and that are aligned to a huge page size. In an example embodiment, the transmitted address is the beginning address of at least one contiguous unused block (e.g., 415 or 435) of allocated guest memory 195A. In an example embodiment, the guest OS 196A transmits an address for each contiguous unused block (e.g., 415 or 435) of guest memory 195A that has been allocated by the guest OS 196A. In an example embodiment, the guest OS 196A also transmits at least one indicator of the size of the guest memory 195A that has been allocated. For example, the guest OS 196A may transmit, in addition a beginning address, the size (e.g., a number of host pages, a number, a size of memory in bytes, or an offset) of each block (e.g., 415 and/or 435) of guest memory 195A that has been allocated by the guest OS 196A.

For example, responsive to receiving a request for 5 host page sized portions of guest memory 195A from the guest OS 196A, the guest OS 196A may identify blocks 415 and 435 as being the only two sets of contiguous blocks that are at least the size of the huge page size of the host page and aligned to the huge page size. As illustrated in the example embodiment, contiguous block 415 is the size of a single huge page sized host page and contiguous block 435 is the size of three huge page sized host pages. Although this amounts to only 4 host pages rather than the requested 5 host pages, the guest OS 196A nevertheless allocates the available guest memory 195A to the host OS 186 using the balloon 197A. The guest OS 196A may then transmit the beginning address of contiguous block 415 and the size of contiguous block 415 (e.g., in this example 1 huge page or 8 guest pages) as well as the beginning address of contiguous block 435 and the size of contiguous block 435 (e.g., in this example 3 huge pages or 24 guest pages) to the hypervisor 180.

The guest OS 196A further designates the contiguous set of memory pages (e.g., 415 and/or 435) that are placed in the balloon 197A as unavailable and will not allow any applications 198A-B, devices (e.g., VCPU 190A, VMD 192A, VI/O 194A), or other processes of the guest OS 196A to use the allocated memory pages (e.g., 415 and 435) until they are removed from the balloon 197A. In an example embodiment, the host OS 180 may use the allocated contiguous blocks (e.g., 415 and/or 435) of guest memory 195A for its own processes. In an example embodiment, the host OS 180 may make the contiguous blocks (e.g., 415 and/or 435) of allocated guest memory 195A available for use by other guest operating systems (e.g., guest OS 196B).

Figure 6:
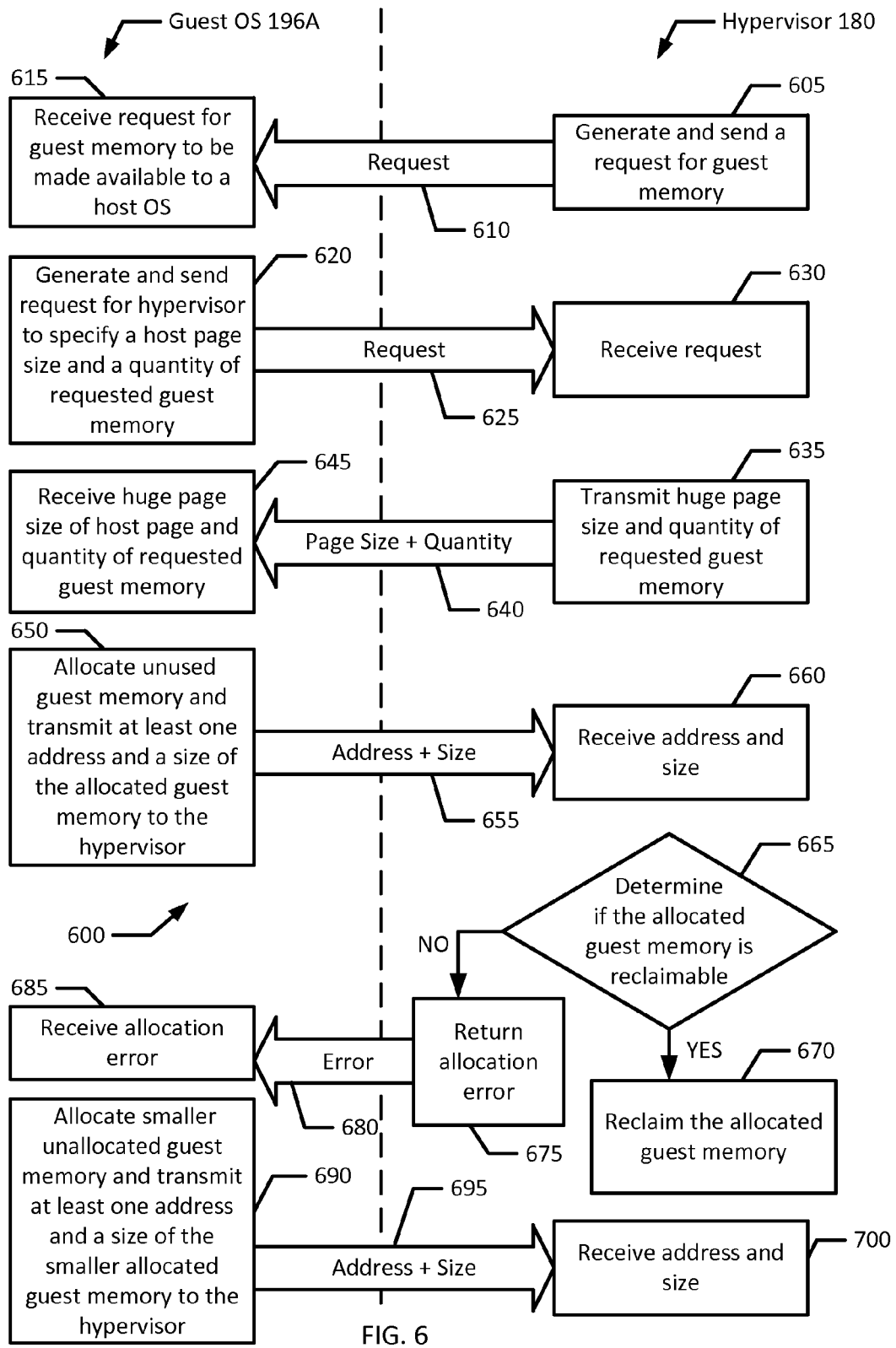
FIG. 6 is a flow diagram illustrating an example process for virtual machine based huge page balloon support according to an example embodiment of the present disclosure.

FIG. 6 illustrates a flow diagram of an example method 600 for virtual machine based huge page balloon support. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may comprise hardware (circuitry, dedicated logic, etc.), software, or a combination of both.

In the illustrated example embodiment, a hypervisor 180 generates and sends to a guest OS 196A a request for guest memory 195A to be made available to a host OS 186 (blocks 605 and 610). The guest OS 196A receives the request (block 615). Responsive to receiving the request, the guest OS 196A generates and sends a request for the hypervisor 180 to specify a host page size and a quantity of requested guest memory 195A (blocks 620 and 625). The hypervisor 180 receives the request (block 630). The hypervisor 180 then transmits to the guest OS 196A a huge page size of a host page of host OS 186 and a quantity of requested guest memory (blocks 635 and 640). The guest OS 196A receives the huge page size and the indicator of the quantity of requested guest memory 195A (block 645).

The guest OS 196A then allocates contiguous unused blocks (e.g., 415 and/or 435) of the guest memory 195A to the host OS 186 (e.g., using a balloon 197A) and transmits at least one address of the allocated guest memory 195A and at least one indicator of the size of the allocated guest memory 195A to the hypervisor 180 (blocks 650 and 655). The hypervisor 180 receives the transmitted address and size information (block 660). The hypervisor 180 then determines whether the each of the allocated contiguous unused blocks (e.g., 415 and/or 435) of guest memory 195A is reclaimable (block 665). In an example embodiment, the hypervisor 180 determines that each of the allocated unused blocks (e.g., 415 and/or 435) of guest memory 195A is reclaimable if each allocated unused blocks (e.g., 415 and/or 435) of guest memory 195A is (a) at least a multiple of the huge page size of a host page, and/or (b) aligned to the multiple of the huge page size of the host page. For example, the hypervisor 180 may determine that contiguous memory blocks 415 and 435 are reclaimable based on the fact that each of them is a multiple of the huge page size of a host page (block 415 is 1 times the size of the huge page size and block 435 is 3 times the size of the huge page size) and the fact that each of them is aligned to a multiple of the huge page size of a host page. On the other hand, if the guest OS 196A allocated contiguous unused block 445 (which only contains 5 guest pages), then the hypervisor 180 may determine that the contiguous memory block 445 is not reclaimable based either on the fact that it does not constitute a multiple of the huge page size of a host page or the fact that it is not aligned to a multiple of the huge page size of a host page.

Responsive to determining that that the allocated guest memory 195A is reclaimable, the hypervisor 180 reclaims the allocated guest memory 195A (block 670). Responsive to determining that the allocated guest memory is not reclaimable, the hypervisor 180 generates and returns an allocation error to the guest OS 196A (blocks 675 and 680). The guest OS 196A receives the allocation error (block 685).

Responsive to receiving the allocation error, the guest OS 196A allocates smaller unused blocks (e.g., 405 and/or 445) of guest memory 195A and transmits at least one address of the allocated smaller unused blocks (e.g., 405 and/or 445) of guest memory 195A and at least one indicator of the size of the allocated smaller unused blocks (e.g., 405 and/or 445) guest memory 195A to the hypervisor 180 (blocks 690 and 695). In an example embodiment, responsive to receiving the allocation error, the guest OS 196A may further deallocate the previously allocated guest memory 195A described in block 650. In an example embodiment, this may involve removing the previously allocated contiguous blocks (e.g., 415 and/or 435) of guest memory 195A from the balloon 197A. The hypervisor 180 receives the transmitted address and size information (block 700).

Although not illustrated in FIG. 6, once the host OS 186 is done using the allocated memory pages, it may release them by having the balloon deflated (e.g., by sending a message to the balloon driver 199A that it no longer needs the allocated memory pages). Once the balloon is deflated, the guest OS 196A may remove the allocated blocks (e.g., 415 and/or 435) of guest memory 195A from the balloon and begin reusing them normally.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, The invention is claimed as follows:

1. A system comprising:
   one or more physical processors;
   a hypervisor executing on the one or more physical processors;
   a host operating system (OS) executing on the one or more physical processors; and
   a virtual machine, including a guest operating system (OS), executing on the one or more physical processors to:
   receive, by the guest OS executing on the virtual machine, from the hypervisor, a request, wherein the request requests guest memory to be made available to the host OS;
   receive, by the guest OS, a huge page size of a host page and a quantity of requested guest memory;
   responsive to receiving the request, allocate, by the guest OS, unused guest memory and transmit, by the guest OS, at least one address of the allocated guest memory to the hypervisor, wherein the allocated guest memory is a contiguous block of memory that is at least the size of the huge page size of the host page; and
   determine, by the hypervisor, that the allocated guest memory is not reclaimable responsive to determining that the allocated guest memory is (a) not a multiple of the huge page size of the host page or (b) not aligned to the multiple of the huge page size of the host page.

2. The system of claim 1, wherein responsive to determining that a second allocated guest memory is reclaimable, the hypervisor reclaims the second allocated guest memory.

3. The system of claim 1, wherein responsive to determining that the allocated guest memory is not reclaimable, indicating, to the guest OS, an allocation error.

4. The system of claim 3, wherein responsive to receiving the allocation error, the guest OS allocates smaller unused guest memory pages and transmits the address of the allocated smaller guest memory pages to the hypervisor.

5. The system of claim 3, wherein responsive to receiving the allocation error, the guest OS deallocates the allocated guest memory.

6. The system of claim 1, wherein the guest memory is comprised of guest pages that are each 4 KiB in size and the host memory is comprised of host pages that are each 2 MiB in size.

7. The system of claim 2, wherein the host OS uses the second allocated guest memory for the host OS's own processes responsive to reclaiming the second allocated guest memory.

8. A method, comprising:
   receiving, by a guest operating system (OS) executing on a virtual machine, from a hypervisor, a request, wherein the request requests guest memory to be made available to a host operating system (OS);
   receiving, by the guest OS, a huge page size of a host page and a quantity of requested guest memory;
   responsive to receiving the request, allocating, by the guest OS, unused guest memory and transmitting, by the guest OS, at least one address of the allocated guest memory to the hypervisor, wherein the allocated guest memory is a contiguous block of memory that is at least the size of the huge page size of the host page; and
   determining, by the hypervisor, that the allocated guest memory is not reclaimable responsive to determining that the allocated guest memory is (a) not a multiple of the huge page size of the host page or (b) not aligned to the multiple of the huge page size of the host page.

9. The method of claim 8, further comprising responsive to determining that a second allocated guest memory is reclaimable, reclaiming, by the hypervisor, the second allocated guest memory.

10. The method of claim 8, further comprising responsive to determining that the allocated guest memory is not reclaimable, indicating, to the guest OS, an allocation error.

11. The method of claim 10, wherein responsive to receiving the allocation error, the guest OS allocates smaller unused guest memory pages and transmits the address of the allocated smaller guest memory pages to the hypervisor.

12. The method of claim 8, wherein the guest memory is comprised of guest pages that are each 4 KiB in size and the host memory is comprised of host pages that are each 2 MiB in size.

13. A computer-readable non-transitory storage medium comprising executable instructions that, when executed by a computer system, cause the computer system to:
   receive, by a guest operating system (OS) executing on a virtual machine, from a hypervisor, a request, wherein the request requests guest memory to be made available to a host operating system (OS);
   receive, by the guest OS, a huge page size of a host page and a quantity of requested guest memory;
   responsive to receiving the request, allocate, by the guest OS, unused guest memory and transmit, by the guest OS, at least one address of the allocated guest memory to the hypervisor, wherein the allocated guest memory is a contiguous block of memory that is at least the size of the huge page size of the host page; and
   determine, by the hypervisor, that the allocated guest memory is not reclaimable responsive to determining that the allocated guest memory is (a) not a multiple of the huge page size of the host page or (b) not aligned to the multiple of the huge page size of the host page.

14. The computer-readable non-transitory storage medium of claim 13, wherein responsive to determining that a second allocated guest memory is reclaimable, the hypervisor reclaims the second allocated guest memory.

15. The computer-readable non-transitory storage medium of claim 13, wherein responsive to determining that the allocated guest memory is not reclaimable, indicating, to the guest OS, an allocation error.

16. The computer-readable non-transitory storage medium of claim 15, wherein responsive to receiving the allocation error, the guest OS allocates smaller unused guest memory pages and transmits the address of the allocated smaller guest memory pages to the hypervisor.

* * * * *